United States Patent
Lee et al.

(10) Patent No.: US 10,376,865 B2
(45) Date of Patent: Aug. 13, 2019

(54) METHODS OF SYNTHESIZING NANO-SIZED TUNGSTEN PARTICLES BY SOL-GEL PROCESS AND METHOD OF PREPARING LIGHT OIL FROM EXTRA-HEAVY OIL USING THE SYNTHESIZED NANO-SIZED TUNGSTEN PARTICLES

(71) Applicant: Korea University Research and Business Foundation, Seoul (KR)

(72) Inventors: Kwan-Young Lee, Seoul (KR); Chan Hun Kim, Seoul (KR); Gwang-Sik Jeong, Seoul (KR); Young Gul Hur, Gyeonggi-do (KR)

(73) Assignee: Korea University Research and Business Foundation, Seoul (KR)

( * ) Notice: Subject to any disclaimer, the term of this patent is extended or adjusted under 35 U.S.C. 154(b) by 97 days.

(21) Appl. No.: 15/795,866

(22) Filed: Oct. 27, 2017

(65) Prior Publication Data

US 2018/0178203 A1   Jun. 28, 2018

(30) Foreign Application Priority Data

Dec. 27, 2016   (KR) .................. 10-2016-0179980

(51) Int. Cl.
*B01J 23/30*   (2006.01)
*B01J 27/22*   (2006.01)
(Continued)

(52) U.S. Cl.
CPC .............. *B01J 27/22* (2013.01); *B01J 23/30* (2013.01); *B01J 35/002* (2013.01); *B01J 35/0013* (2013.01); *B01J 35/0073* (2013.01); *B01J 35/023* (2013.01); *B01J 35/08* (2013.01); *B01J 37/0018* (2013.01); *B01J 37/0236* (2013.01); *B01J 37/031* (2013.01); *B01J 37/14* (2013.01); *B01J 37/16* (2013.01); *B01J 37/18* (2013.01); *C10G 47/12* (2013.01)

(58) Field of Classification Search
CPC ... B01J 27/22; B01J 35/08; B01J 37/18; B01J 23/30; B01J 37/0018; B01J 35/002; B01J 37/14; B01J 35/0073; B01J 35/023; B01J 37/16; B01J 37/0236; B01J 35/0013; B01J 37/031; C10G 47/12
See application file for complete search history.

(56) References Cited

U.S. PATENT DOCUMENTS 9,283,545 B2 *   3/2016   Asefa ..................... B01J 21/08

\* cited by examiner

*Primary Examiner* — Randy Boyer
*Assistant Examiner* — Juan C Valencia
(74) *Attorney, Agent, or Firm* — Fox Rothschild LLP

(57) ABSTRACT

Disclosed is a method of synthesizing nano-sized tungsten-silica core-shell particles by a silica-based sol-gel process. According to the method, tungsten-silica nanoparticles are very easy to synthesize by a simple process at ambient pressure and temperature. In addition, tungsten oxide-silica ($WO_x@SiO_2$) nanoparticles including tungsten in a stable oxidation state can be synthesized. In the tungsten oxide-silica nanoparticles, the size of the tungsten protected with the silica shell can be maintained in the nanometer range without further processing. Also disclosed is a method of synthesizing nano-sized tungsten oxide ($WO_x$) and tungsten carbide (WC) particles by further processing of the tungsten-silica core-shell particles.

7 Claims, 4 Drawing Sheets

(51) Int. Cl.
*B01J 35/00* (2006.01)
*B01J 35/02* (2006.01)
*B01J 35/08* (2006.01)
*B01J 37/00* (2006.01)
*B01J 37/02* (2006.01)
*B01J 37/03* (2006.01)
*B01J 37/14* (2006.01)
*B01J 37/16* (2006.01)
*B01J 37/18* (2006.01)
*C10G 47/12* (2006.01)

METHODS OF SYNTHESIZING NANO-SIZED TUNGSTEN PARTICLES BY SOL-GEL PROCESS AND METHOD OF PREPARING LIGHT OIL FROM EXTRA-HEAVY OIL USING THE SYNTHESIZED NANO-SIZED TUNGSTEN PARTICLES

BACKGROUND OF THE INVENTION

1. Field of the Invention

The present invention relates to methods of synthesizing nano-sized tungsten particles by a sol-gel process and a method of preparing light oil from extra-heavy oil using the synthesized tungsten particles. More specifically, the present invention relates to a method of synthesizing nano-sized tungsten-silica core-shell particles by a silica-based sol-gel process, a method of synthesizing nano-sized tungsten oxide ($WO_x$) and tungsten carbide (WC) particles by further processing of the synthesized tungsten-silica core-shell particles, and a method preparing of light oil from extra-heavy oil using the synthesized nano-sized tungsten particles.

2. Description of the Related Art

In recent years, the oversupply of crude oil has caused oil prices to fall. Due to economic growth in non-OECD countries, such as China, India, and Russia, it is also anticipated that there will be an ever-increasing demand for crude oil. The discovery of new oil reserves has been in decline since the 1990's. It is already known that light crude oil reserves have reached the highest level. Accordingly, it can be concluded that the increasing demand for crude oil promotes the depletion of light crude oil.

Under such circumstances, renewable energy sources, for example, hydrogen energy and wind power, are being investigated for their ability to replace light crude oil. However, such renewable energy requires new production equipment and high production costs, making its practical application difficult. Extra-heavy oil is highly viscous and contains large amounts of heavy metals and sulfur. Nevertheless, extra-heavy oil has received attention as a substitute resource for light crude oil whose reserves are declining because existing equipment can be used for extra-heavy oil production and some countries, including Venezuela, are abundant in extra-heavy oil.

Extra-heavy oil refers to a crude oil whose density is less than 10° API (American Petroleum Institute) and includes bitumen extracted from crude oil and oil sands from Venezuela. Vacuum residue produced when crude oil is distilled can be categorized as extra-heavy oil due to its very low API value.

Extra-heavy oil can be decomposed by various cracking processes, such as catalytic cracking, hydrocracking, and thermal cracking. Research on thermal cracking processes for the upgrading of extra-heavy oil is being conducted into reducing the viscosity by cleavage of carbon-carbon (C—C) bonds under heating or increasing the hydrogen/carbon (H/C) ratio in liquid by coking. Thermal cracking is mainly used because it requires low operating cost and is relatively easy to perform. However, thermal cracking causes excessive loss of carbon, resulting in low process efficiency, and causes loss of hydrogen, making it difficult to produce high-quality oil.

Various catalysts available for hydrocracking were reported. However, most of them are not durable enough to cause cracking reactions under extreme conditions, for example, for cracking of extra-heavy oil or lose their catalytic activity by metal components of extra-heavy oil.

Thus, development of catalysts and cracking processes that can efficiently utilize is gaining importance.

A method of producing heavy oil using noble metal-supported zeolite catalysts is described in "Middle distillate production by the hydrocracking of FT wax over solid acid catalysts", Jeong Heon-Do, et al., The Korean Society for New and Renewable Energy, Spring Conference, p 114, 2010. However, the supported catalysts are difficult to use under conditions for the cracking of extra-heavy oil.

Tungsten has been widely used as an alloy element and in various metal compounds for its high strength. Tungsten was developed for sulfur removal in the petrochemical industry and is still in use as a catalyst due to its superior performance. Particularly, nano-sized tungsten carbides were reported as substitutes for platinum in the field of catalysts. Thus, tungsten is of considerable academic interest.

SUMMARY OF THE INVENTION

The present invention is intended to provide a method of synthesizing tungsten-silica nanoparticles by a sol-gel process, a method of synthesizing tungsten-based nanoparticles from the synthesized tungsten-silica nanoparticles, and a method of preparing light oil using an unsupported dispersible WC nanocatalyst composed of the tungsten particles.

One aspect of the present invention provides a method of synthesizing tungsten-silica nanoparticles: including (a) dissolving a tungsten precursor and a surfactant in an organic solvent to obtain a mixture solution; (b) dissolving water, aqueous ammonia, and a silica precursor in the mixture solution to synthesize tungsten oxide-silica core-shell nanoparticles; and (c) dispersing the mixture solution containing the tungsten oxide-silica core-shell nanoparticles in a solvent to precipitate the tungsten oxide-silica core-shell nanoparticles and drying the precipitates.

According to the present invention, the method may further include annealing the tungsten oxide-silica nanoparticles at a temperature of 400 to 500° C. in an oxygen or air atmosphere for complete oxidation.

According to the present invention, the method may further include annealing the tungsten oxide-silica nanoparticles at a temperature of 700 to 900° C. in a 10-30% (v/v) $CH_4/H_2$ atmosphere.

According to the present invention, the method may further include reducing the tungsten oxide-silica nanoparticles in an aqueous solution containing a small amount of sodium borohydride ($NaBH_4$). The reduction may be performed with continuous stirring until hydrogen gas is no longer evolved or by annealing at a high temperature in a hydrogen atmosphere.

The present invention also provides a method of synthesizing tungsten-based nanoparticles, including treating the tungsten-silica nanoparticles with at least one material selected from the group consisting of KOH, NaOH, HF, and ammonium bifluoride to remove the silica.

The present invention also provides a method of preparing light oil, including (a) mixing the tungsten nanoparticles with extra-heavy oil to obtain a mixture; (b) adding hydrogen to the mixture; and (c) hydrocracking the hydrogen-containing mixture at 400 to 500° C. for 3 to 4 hours.

According to the present invention, tungsten-silica nanoparticles are very easy to synthesize by a simple process at ambient pressure and temperature.

According to the present invention, tungsten oxide-silica ($WO_x$@$SiO_2$) nanoparticles including tungsten in a stable oxidation state can be synthesized. In the tungsten oxide-silica nanoparticles, the size of the tungsten protected with the silica shell can be maintained in the nanometer range without further processing.

According to the present invention, various kinds of tungsten-based silica core-shell particles, such as W@$SiO_2$ and $WC_y$@$SiO_2$ (where y is 0.5 or 1) nanoparticles, can be easily synthesized from the $WO_x$@$SiO_2$ (where x is 2 or 3) nanoparticles. Particularly, a multi-component compound can be easily synthesized by simply mixing the tungsten oxide-silica nanoparticles with an aqueous solution containing various transition metal ions.

In addition, various kinds of tungsten-based particles, such as W, $WO_x$, and $WC_x$ particles, can be easily obtained from the silica core-shell particles by removing the silica shell.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE INVENTION

Figure 1:
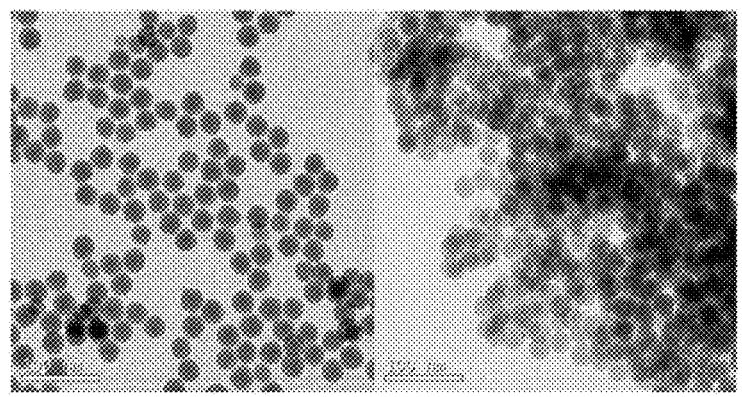
FIG. 1 shows TEM images of tungsten oxide-silica ($WO_x$@$SiO_2$) core-shell particles (left) and tungsten carbide-silica (WC@$SiO_2$) core-shell particles (right) synthesized in Example 1.

The present invention will now be described in more detail.

The present invention is directed to methods of synthesizing nano-sized tungsten particles by a sol-gel process. More specifically, the present invention is directed to a method of synthesizing tungsten-silica core-shell nanoparticles and a method of synthesizing tungsten oxide-based nanoparticles by further processing of the synthesized tungsten-silica core-shell nanoparticles.

Desired nanoparticles are generally synthesized by mixing a support (e.g., a surfactant) with bare nanoparticles in a liquid to form micelles or reverse micelles, which suppress and control the growth of the bare nanoparticles, and further processing the controlled particles by annealing or reduction.

Tungsten chlorides, ammonium metatungstate, ammonium paratungstate, and tungsten alkoxides can be used as tungsten precursors for the synthesis of tungsten nanoparticles.

Ammonium metatungstate and ammonium paratungstate are the most widely used precursors and can be extensively applied to reactions in aqueous solution due to their high water solubility.

The chlorine atoms of tungsten chlorides are easily replaced by oxygen atoms due to their instability in air. Tungsten chlorides are readily soluble in organic solvents. When dissolved in an organic solvent, a tungsten chloride forms a red solution in which it exists in a molecular form.

Tungsten alkoxides easily bond with water to form the corresponding alcohols and tungsten oxides. Tungsten alkoxides are readily soluble in organic solvents. A tungsten alkoxide with less number of carbon atoms more rapidly reacts with water. When dissolved in an organic solvent, a tungsten alkoxide forms a transparent solution.

Tungsten cations formed from the precursors have a wide range of oxidation numbers, which explains their high reactivity at ambient temperature and pressure. Particularly, when the tungsten compounds are dissolved in liquids to prepare liquid nanoparticles, various kinds of tungsten cations may be formed depending on the liquid environments.

The present invention is directed to a method of preparing light oil from extra-heavy oil using an unsupported nano-sized WC catalyst. The present invention is also directed to an unsupported dispersible WC nanocatalyst for preparing light oil from extra-heavy oil.

The method of synthesizing tungsten-silica nanoparticles according to the present invention includes (a) dissolving a tungsten precursor and a surfactant in an organic solvent to obtain a mixture solution; (b) dissolving water, aqueous ammonia, and a silica precursor in the mixture solution to synthesize tungsten oxide-silica core-shell nanoparticles; and (c) dispersing the mixture solution containing the tungsten oxide-silica core-shell nanoparticles in a solvent to precipitate the tungsten oxide-silica core-shell nanoparticles and drying the precipitates.

The individual steps of the method according to the present invention will be explained.

In step (a), a tungsten precursor and a surfactant are dissolved in an organic solvent to obtain a mixture solution.

The tungsten precursor refers to a group of tungsten chlorides. The use of a tungsten chloride unsubstituted with oxygen is preferred.

The surfactant is selected from Triton X, Igepal CO, and Brij series nonionic surfactants. The use of Igepal CO-520 is preferred.

The organic solvent is preferably selected from the group consisting of cyclohexane, ethanol, and a mixture thereof.

The tungsten precursor is preferably used in such an amount that the weight of the tungsten precursor per millimeter of the organic solvent is from 0.0009 g to 0.004 g.

The surfactant is preferably used in such an amount that the weight of the surfactant per millimeter of the organic solvent is from 0.05 g to 0.2 g.

The mixture solution is transparent and is colored pale red.

In step (b), the mixture solution is mixed with water and aqueous ammonia and a silica precursor is dissolved therein to synthesize tungsten oxide-silica core-shell nanoparticles or nanoparticles embedded in silica.

The water is preferably added in such an amount that the volume of the water per gram of the tungsten precursor is from 3.58 ml to 12 ml, preferably from 3.5 ml to 4 ml.

Preferably, the aqueous ammonia has a concentration of 28 to 30% and is added in such an amount that the volume of the aqueous ammonia per gram of the tungsten precursor is from 1.0 ml to 12 ml and the pH of the aqueous ammonia is from 9 to 11. If the volume of the aqueous ammonia per gram of the tungsten precursor is less than 2.5 ml, the mixture solution becomes strongly acidic, thus being unsuitable for use in the synthesis of porous silica. Meanwhile, if the volume of the aqueous ammonia per gram of the tungsten precursor exceeds 12 ml, no problems are encountered in a sol-gel reaction but silica is relatively rapidly synthesized, resulting in the formation of tungsten oxide particles outside rather than inside the silica shell.

The silica precursor added to the mixture solution is preferably tetraethyl orthosilicate (TEOS). TEOS is added in such an amount that the volume of TEOS per gram of the tungsten precursor is from 5 ml to 30 ml.

When the water is used in an amount such that the mixture solution does not become cloudy and the resulting mixture has a pH of 9 or above, core-shell structures are synthesized in which tungsten is embedded in silica. Depending on the conditions, well-defined core-shell structures may be obtained, which is described in detail in Examples 1 and 2.

In step (c), the mixture solution containing the tungsten oxide-silica core-shell nanoparticles is dispersed in a solvent to precipitate the tungsten oxide-silica core-shell nanoparticles and the precipitates are then dried.

The solvent is selected from the group consisting of ethanol, acetone, and a mixture thereof. Ethanol is preferably used.

The precipitates are collected by centrifugation at 6000 to 150000 rpm for at least 5 minutes, dried in an oven at 60° C. for at least 12 hours, and stored before use.

The tungsten oxide-silica nanoparticles may be additionally processed to synthesize the various tungsten nanoparticles.

The additional processing may be done as follows:

(1) the tungsten oxide-silica nanoparticles may be pretreated for a subsequent reaction;

(2) the tungsten oxide-silica nanoparticles may be processed to synthesize WC-silica nanoparticles; or (3) the tungsten oxide-silica nanoparticles may be processed to synthesize reduced tungsten-silica nanoparticles.

Optionally, (4) the particles obtained in (1), (2), and (3) may be processed to remove the silica shells.

Process (1) includes annealing the tungsten oxide-silica nanoparticles at a temperature of 400 to 500° C. in an oxygen or air atmosphere.

Process (2) includes annealing the tungsten oxide-silica nanoparticles at a temperature of 700 to 900° C. in a 10-30% (v/v) $CH_4/H_2$ atmosphere.

Process (3) includes reducing the tungsten oxide-silica nanoparticles in an aqueous solution containing a small amount of sodium borohydride ($NaBH_4$). The reduction may be performed with continuous stirring until hydrogen gas is no longer evolved or by annealing at a high temperature in a hydrogen atmosphere.

Process (4) includes treating the particles obtained in Processes (1), (2), and (3) with at least one material selected from the group consisting of KOH, NaOH, HF, and ammonium bifluoride to remove the silica.

The present invention also provides a method of preparing light oil, including (a) mixing the tungsten nanoparticles with extra-heavy oil to obtain a mixture; (b) adding hydrogen to the mixture; and (c) hydrocracking the hydrogen-containing mixture at 400 to 500° C. for 3 to 4 hours.

According to the present invention, the final nanoparticles may be WC particles.

According to the present invention, the extra-heavy oil may be selected from the group consisting of crude oil whose density is from 1 to 10° API (American Petroleum Institute), bitumen, vacuum residue, and mixtures thereof.

The present invention will be explained in detail with reference to the following examples. However, these examples are provided to assist in understanding the invention and are not intended to limit the scope of the invention.

Example 1

120 ml of cyclohexane, 0.12 g of $WCl_6$, and 12 g of Igepal CO-520 were mixed together in a 250 ml media bottle. The mixture was stirred with a magnetic stirrer at 250 rpm for 10 min. To the mixture was added 1.00 ml of distilled water. The resulting mixture was stirred for 10 min. Thereafter, 0.92 ml of aqueous ammonia was added and stirring was continued for 15 min. Finally, 2.00 ml of TEOS was added, followed by stirring for 16 h. The reaction mixture was precipitated by adding ethanol and centrifuged at 6000 rpm for 5 min to separate tungsten oxide silica nanoparticles. The nanoparticles were collected, dried at 60° C. for 12 h, and stored before use.

Figure 2:
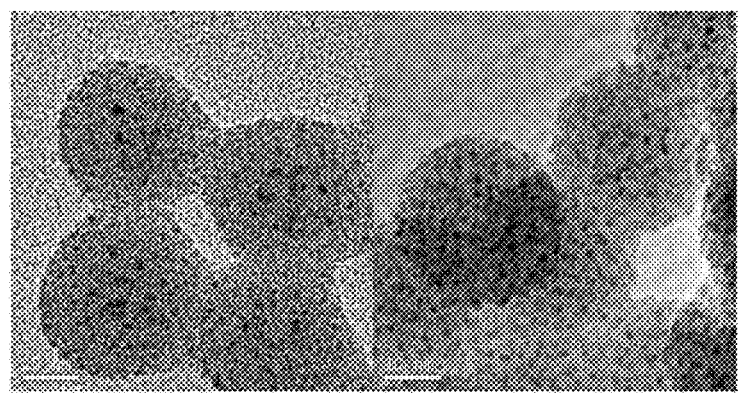
FIG. 2 shows higher (10×) magnification images of FIG. 1.

The tungsten oxide-silica nanoparticles were ca. 15-25 nm in size and had a structure in which tungsten oxide particles were distributed. TEM images of the tungsten oxide-silica nanoparticles are shown in FIGS. 1 and 2.

Example 2

Nanoparticles were synthesized in the same manner as in Example 1, except that the amount of aqueous ammonia was changed.

Specifically, 120 ml of cyclohexane, 0.12 g of $WCl_6$, and 12 g of Igepal CO-520 were mixed together in a 250 ml media bottle. The mixture was stirred with a magnetic stirrer at 250 rpm for 10 min. To the mixture were added 1.00 ml of water and 0.63 ml of aqueous ammonia. The resulting mixture was stirred for 10 min. Finally, 2.00 ml of TEOS was added, followed by stirring for 16 h. The reaction mixture was precipitated by adding ethanol and centrifuged at 6000 rpm for 5 min to separate tungsten oxide silica nanoparticles. The nanoparticles were collected, dried at 60° C. for 12 h, and stored before use.

Figure 3:
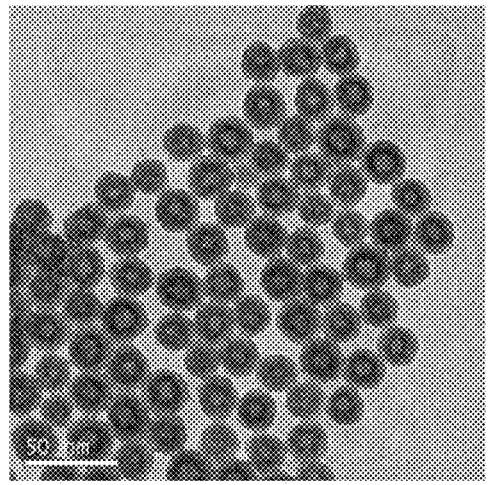
FIG. 3 is a TEM image of tungsten oxide-silica nanoparticles synthesized in Example 2.

The tungsten oxide-silica nanoparticles were found to have a size of ca. 15-25 nm and a structure in which single tungsten oxide particle was normally formed in silica shell. Particularly, the water was evaporated during drying, leaving empty spaces in the nanoparticles. A TEM image of the nanoparticles is shown in FIG. 3.

Comparative Example 1

Nanoparticles were synthesized in the same manner as in Example 1, except that the amount of aqueous ammonia was changed.

Specifically, 100 ml of cyclohexane, 0.12 g of $WCl_6$, and 12 g of Igepal CO-520 were mixed together in a 250 ml media bottle. The mixture was stirred with a magnetic stirrer at 250 rpm for 10 min. To the mixture were added 1.00 ml of water and 0.40 ml of aqueous ammonia. The resulting mixture was stirred for 10 min. Finally, 2.00 ml of TEOS was added, followed by stirring for 16 h. The reaction mixture was precipitated by adding ethanol and centrifuged at 6000 rpm for 5 min to separate tungsten oxide silica nanoparticles. The nanoparticles were collected, dried at 60° C. for 12 h, and stored before use.

Figure 4:
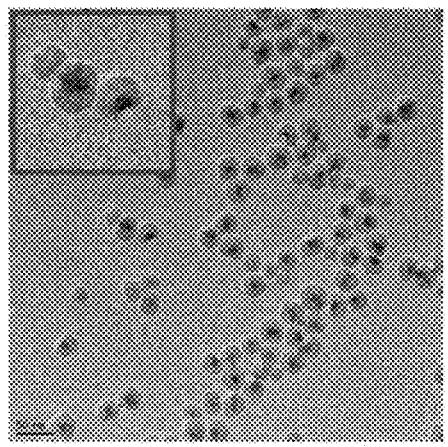
FIG. 4 is a TEM image of deformed tungsten oxide-silica nanoparticles synthesized in Comparative Example 1.

The tungsten oxide-silica nanoparticles were found to have a size of ca. 15-25 nm and a structure in which tungsten oxide particles were abnormally deformed in silica. A TEM image of the nanoparticles is shown in FIG. 4.

Example 3

The tungsten oxide-silica nanoparticles synthesized in Example 2 were transferred to a calcination furnace. The particles were heated to 450° C. in air over 3.5 h and kept at the same temperature for 1 h. The particles were allowed to cool to room temperature.

Figure 5:
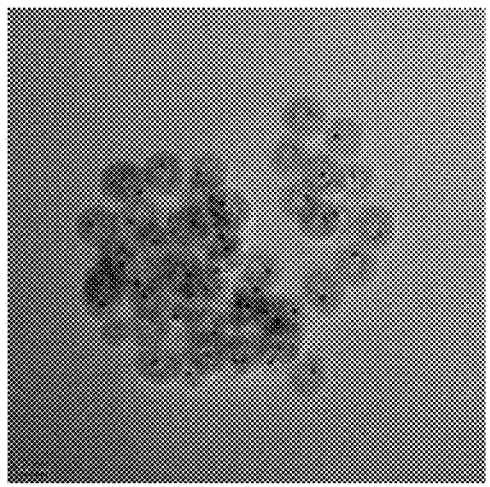
FIG. 5 is a TEM image of tungsten carbide-silica nanoparticles synthesized in Example 3.
Figure 6:
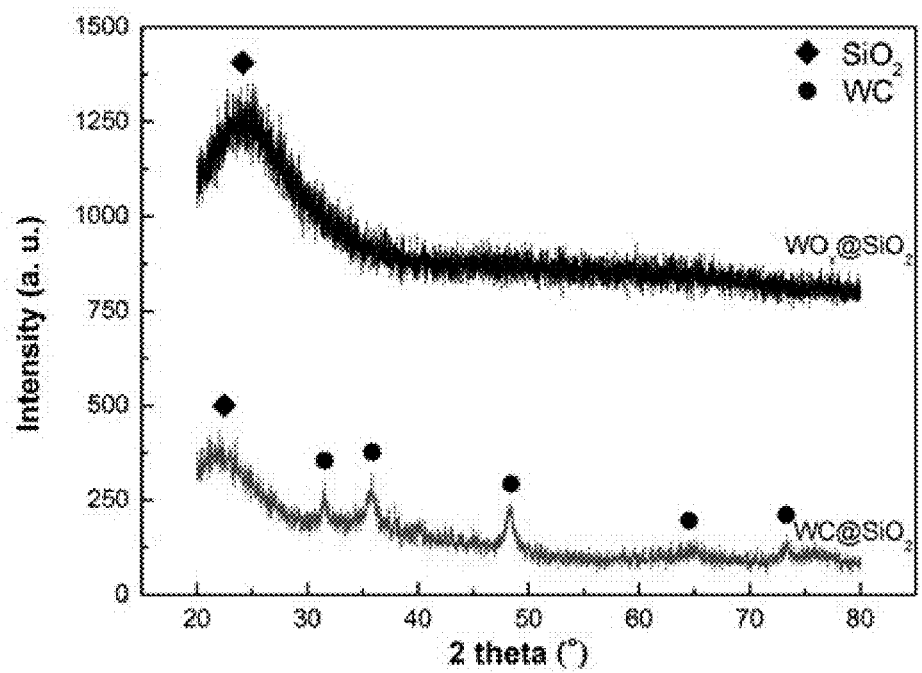
FIG. 6 is an XRD patterns of tungsten oxide-silica ($WO_x$@$SiO_2$) tungsten carbide-silica (WC@$SiO_2$) nanoparticles synthesized in Example 2 and Example 3, respectively.

The nanoparticles were collected, transferred to a calcination tube furnace, heated to 590° C. over 4 h 40 min under a flow of 150 sccm 21% $CH_4/H_2$, and kept for 1 h. Thereafter, the nanoparticles were heated to 800° C. over 1 h 45 min under the same gas atmosphere, kept for 6 h, maintained under a flow of 100 sccm $H_2$ for 1 h, and naturally cooled. The resulting tungsten carbide-silica nanoparticles were collected and vacuum packed in a container protected from light before storage. FIGS. 5 and 6 show a TEM image and an XRD spectra of the tungsten carbide-silica nanoparticles, respectively.

For removal of the shell, the collected WC silica particles were stirred in 20 wt. % of ammonium bifluoride for 24 h.

The solution was neutralized with the same amount of aqueous ammonia, washed with distilled water, and centrifuged at 15000 rpm for 10 min to separate the WC nanoparticles. The WC nanoparticles were dried at reduced pressure and 60° C. and vacuum packed in a container protected from light before storage.

Figure 7:
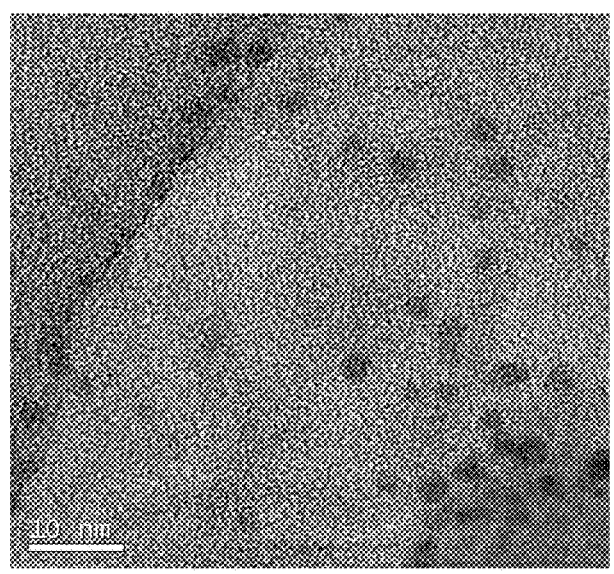
FIG. 7 is a TEM image of tungsten carbide nanoparticles synthesized in Example 3.

The WC nanoparticles were found to have a size of ca. 1-5 nm and an average diameter of 2.8 nm. FIG. 7 is a TEM image of the WC nanoparticles.

Example 4

30 g of vacuum residue (API°=2.32, SK Innovation) as a reactant was filled in a 100 ml reactor and 30 mg of the tungsten carbide nanocatalyst was filled in the reactor. The reactor was purged three times with 10 bar of hydrogen, followed by filling with 70 bar of hydrogen. The reactor was heated for 30 min to adjust the reaction temperature to 400° C. The temperature was maintained for 10 min to reach the steady state. After stirring was continued at 1000 rpm for 4 h, the reactor was cooled to room temperature using a cooling jacket. The physical properties of the products were analyzed.

Figure 8:
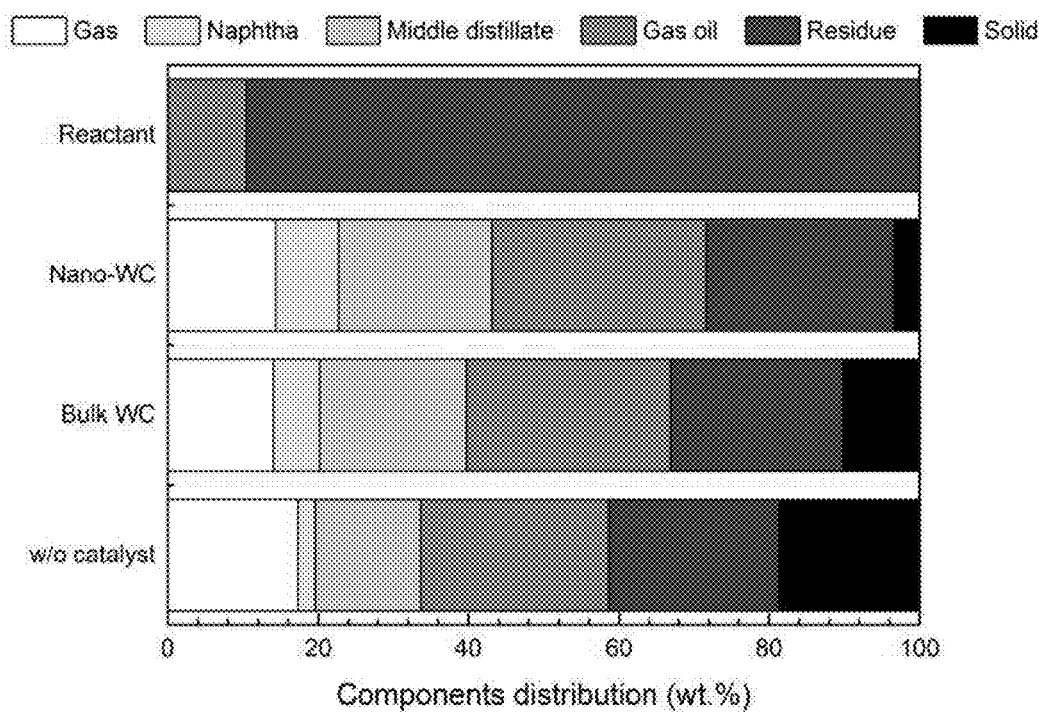
FIG. 8 shows results obtained when extra-heavy oil was cracked using a nano-sized WC catalyst and a bulk WC catalyst.
Figure 9:
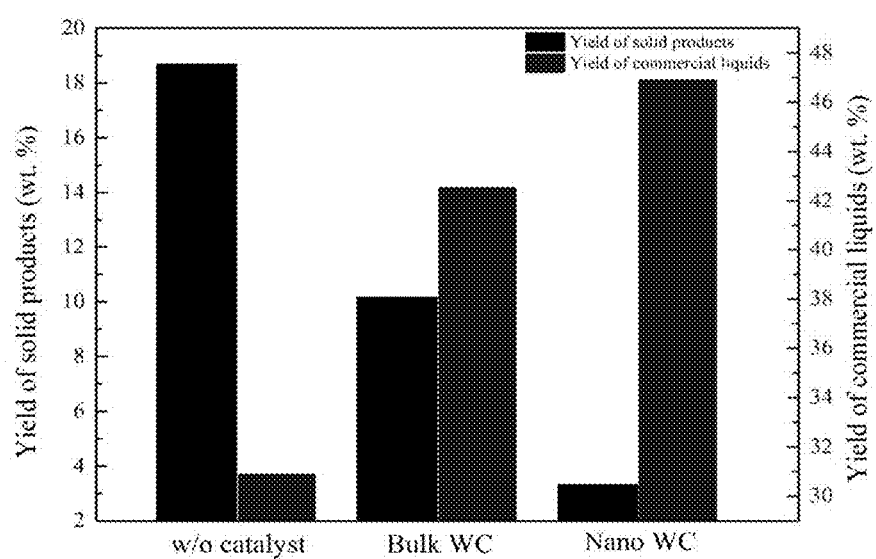
FIG. 9 summarizes the amounts of cokes and the yields of high value-added liquids produced when extra-heavy oil was cracked using a nano-sized WC catalyst and a bulk WC catalyst.

The hydrocracking products from the extra-heavy oil were divided into solid products (cokes), liquid products (naphtha, middle distillate, gas oil, and residue), and gas products. The liquid products were analyzed by simulated distillation (SIMDIS). The results are shown in Table 1 and FIGS. 8 and 9.

TABLE 1

| | Catalyst | | |
|---|---|---|---|
| | w/o catalyst | Bulk WC | Nano WC |
| Gas products (wt. %) | 17.3 | 14.0 | 14.3 |
| Liquid products (wt. %) | 64.0 | 75.8 | 82.4 |
| Solid products (wt. %) | 18.7 | 10.2 | 3.3 |
| Distribution of liquid products (wt. %) | | | |
| <177° C. (naphtha) | 2.3 | 6.14 | 8.4 |
| 177° C.-345° C. (middle distillate) | 14.1 | 19.6 | 20.4 |
| 345° C.-525° C. (gas oil) | 24.9 | 27.2 | 28.5 |
| >525° C. (residue) | 22.77 | 22.9 | 25 |

The yields of the gas products, liquid products, and solid products were 17.3 wt. %, 64.0 wt. %, and 18.7 wt. %, respectively, in the control (w/o catalyst). The yield of the liquid products was low whereas the yields of the gas products and solid products were high.

In contrast, the yield of the liquid products (82.4 wt. %) obtained when the unsupported dispersible WC nanocatalyst was used was higher than the yields of the liquid products obtained when no catalyst was used (control) and the bulk WC catalyst was used. In addition, the yield (3.3 wt. %) of the solid products obtained when the unsupported dispersible WC nanocatalyst was used was considerably low compared to the yields of the solid products obtained when no catalyst was used (control) and the bulk WC catalyst was used. The yield of the gas products obtained when the unsupported dispersible WC nanocatalyst was used was 14.3 wt. %.

These results demonstrate that the unsupported dispersible WC nanocatalyst promoted the hydrocracking of extra-heavy oil.

In conclusion, the unsupported nano-sized dispersible WC nanocatalyst showed improved catalytic activity for the production of light oil from vacuum residue.

Although the particulars of the present disclosure have been described in detail, it will be obvious to those skilled in the art that such particulars are merely preferred embodiments and are not intended to limit the scope of the present invention. Therefore, the true scope of the present invention is defined by the appended claims and their equivalents.

What is claimed is:

1. A method of synthesizing tungsten-silica nanoparticles: comprising (a) dissolving a tungsten precursor and a surfactant in an organic solvent to obtain a mixture solution; (b) dissolving water, aqueous ammonia, and a silica precursor in the mixture solution to synthesize tungsten oxide-silica core-shell nanoparticles; and (c) dispersing the mixture solution containing the tungsten oxide-silica core-shell nanoparticles in a solvent to precipitate the tungsten oxide-silica core-shell nanoparticles and drying the precipitates.

2. The method according to claim 1, further comprising annealing the tungsten oxide-silica nanoparticles at a temperature of 400 to 500° C. in an oxygen or air atmosphere for complete oxidation.

3. The method according to claim 1, further comprising annealing the tungsten oxide-silica nanoparticles at a temperature of 700 to 900° C. in a 10-30% (v/v) $CH_4/H_2$ atmosphere.

4. The method according to claim 1, further comprising reducing the tungsten oxide-silica nanoparticles in an aqueous solution containing a small amount of sodium borohydride ($NaBH_4$).

5. The method according to claim 4, wherein the reduction is performed with continuous stirring until hydrogen gas is no longer evolved or by annealing at a high temperature in a hydrogen atmosphere.

6. A method of synthesizing tungsten-based nanoparticles, comprising treating tungsten-silica nanoparticles synthesized by the method according to claim 1 with at least one material selected from the group consisting of KOH, NaOH, HF, and ammonium bifluoride to remove the silica.

7. A method of preparing light oil, comprising (a) mixing the tungsten nanoparticles synthesized by the method according to claim 1 with extra-heavy oil to obtain a mixture; (b) adding hydrogen to the mixture; and (c) hydrocracking the hydrogen-containing mixture at 400 to 500° C. for 3 to 4 hours.

* * * * *